US012536310B2

(12) United States Patent
Malamut et al.

(10) Patent No.: US 12,536,310 B2
(45) Date of Patent: Jan. 27, 2026

(54) PREVENTING UNDESIRED DELETES ON PROTECTION STORAGE USING DELETE RESTRICTION WITH ALERTS FOR EXCESSIVE DELETES

(71) Applicant: Dell Products L.P., Round Rock, TX (US)

(72) Inventors: Mark Malamut, Aliso Viejo, CA (US); Adam Brenner, Mission Viejo, CA (US); Arun Murti, Mission Viejo, CA (US)

(73) Assignee: Dell Products L.P., Hopkinton, MA (US)

( * ) Notice: Subject to any disclaimer, the term of this patent is extended or adjusted under 35 U.S.C. 154(b) by 22 days.

(21) Appl. No.: 18/417,444

(22) Filed: Jan. 19, 2024

(65) Prior Publication Data

US 2024/0232399 A1    Jul. 11, 2024

Related U.S. Application Data

(63) Continuation-in-part of application No. 17/867,655, filed on Jul. 18, 2022, now Pat. No. 12,153,495.

(51) Int. Cl.
*G06F 21/62* (2013.01)
*G06F 21/55* (2013.01)

(52) U.S. Cl.
CPC ............ *G06F 21/62* (2013.01); *G06F 21/552* (2013.01); *G06F 2221/2135* (2013.01)

(58) Field of Classification Search
CPC ................... G06F 21/62; G06F 21/552; G06F 2221/2135; G06F 11/1453; G06F 11/1461; G06F 11/1451
USPC ........................................................... 726/1
See application file for complete search history.

(56) References Cited

U.S. PATENT DOCUMENTS

2018/0373877 A1* 12/2018 Bruso .................. G06F 21/552
2023/0229589 A1*  7/2023 Ponnuswamy ..... G06F 12/0253

* cited by examiner

*Primary Examiner* — Yair Leibovich
(74) *Attorney, Agent, or Firm* — Staniford Tomita LLP (57) ABSTRACT

Embodiments are described for preventing undesired data deletion on protection storage by using delete restrictions and issuing user alerts if an excessive number of deletions are requested within a period of time. The number of deletions per time period is recorded and stored as hash counts. Deletion of data is delayed until confirmation by the user is received. One or more metrics are computed from the recorded count data and corresponding deleted data sizes. The computed metrics are compared to defined corresponding threshold values, and if any of the metrics exceeds the corresponding threshold value, an alert is sent to the user. The user can then choose to stop or investigate the deletions, or acknowledge the deletions to provide the confirmation.

20 Claims, 7 Drawing Sheets

| Date | Number of Data Hashes | Approx. Data Size (MB) |
|---|---|---|
| 1/1/2024 | 12053 | 361.6 |
| 1/2/2024 | 14123 | 423.7 |
| 1/3/2024 | 18512 | 555.4 |
| 1/4/2024 | 14368 | 431 |

| Date | % Bytes Average | % Variance from Prior |
|---|---|---|
| 1/1/2024 | -18% | |
| 1/2/2024 | -4% | 17% |
| 1/3/2024 | 25% | 31% |
| 1/4/2024 | -3% | -22% |

| Metric | Threshold |
|---|---|
| Average in MB | 10% |
| Max. Daily Variance | 20% |

PREVENTING UNDESIRED DELETES ON PROTECTION STORAGE USING DELETE RESTRICTION WITH ALERTS FOR EXCESSIVE DELETES

CROSS-REFERENCE TO RELATED APPLICATIONS

This application is a Continuation-In-Part application and claims priority to U.S. patent application Ser. No. 17/867,655 filed on Jul. 18, 2022 and entitled "Preventing Attacks on Protection Storage Using Delete Restriction," which is assigned to the assignee of the present application, and which is hereby incorporated by reference in its entirety.

TECHNICAL FIELD

This invention relates generally to data protection, and more specifically to preventing ransomware attacks on protection storage using delete restrictions.

BACKGROUND

Data protection involves the routine backup of data from primary memory storage to trusted secondary or backup storage devices. Whether in local memory or long-term storage, data is generally vulnerable to attack from various actors. Various different types of data or cybersecurity attacks can be used to target computer systems, including denial-of-service (DOS) attacks, man-in-the-middle (MITM) attacks, phishing attacks, password attacks, and so on.

Ransomware attacks are another common type of attack, and are an important concern for nearly all organizations. Attack vectors can come from multiple directions and target not only primary storage, but also secondary/backup storage. A major vulnerability is that once system access is obtained, hackers can alter and/or delete data with a low risk of detection. These rogue attacks are known to circumvent existing protection mechanisms, such as write-only settings and dual-party authentication, which can be bypassed if security office credentials are obtained.

Some measures have been developed to defend against such attacks. For example, imposing a requirement in which data removal requires multiple confirmations would provide a high level of protection against attacks. While other techniques such as retention locks can prevent data from being erased based on a specific, singular point-in-time. However, retention lock, dual party authorization, and similar systems do not completely prevent ransomware attacks. For example, a retention lock simply sets a timestamp on data and forces it to persist until the timestamp has been reached.

What is needed, therefore is a data protection system where data is written once, and deletion is restricted in that it only is removed from the storage system based on a set of rules that are designed to prevent rogue data deletion requests from actually erasing the data from persistent storage.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), and metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
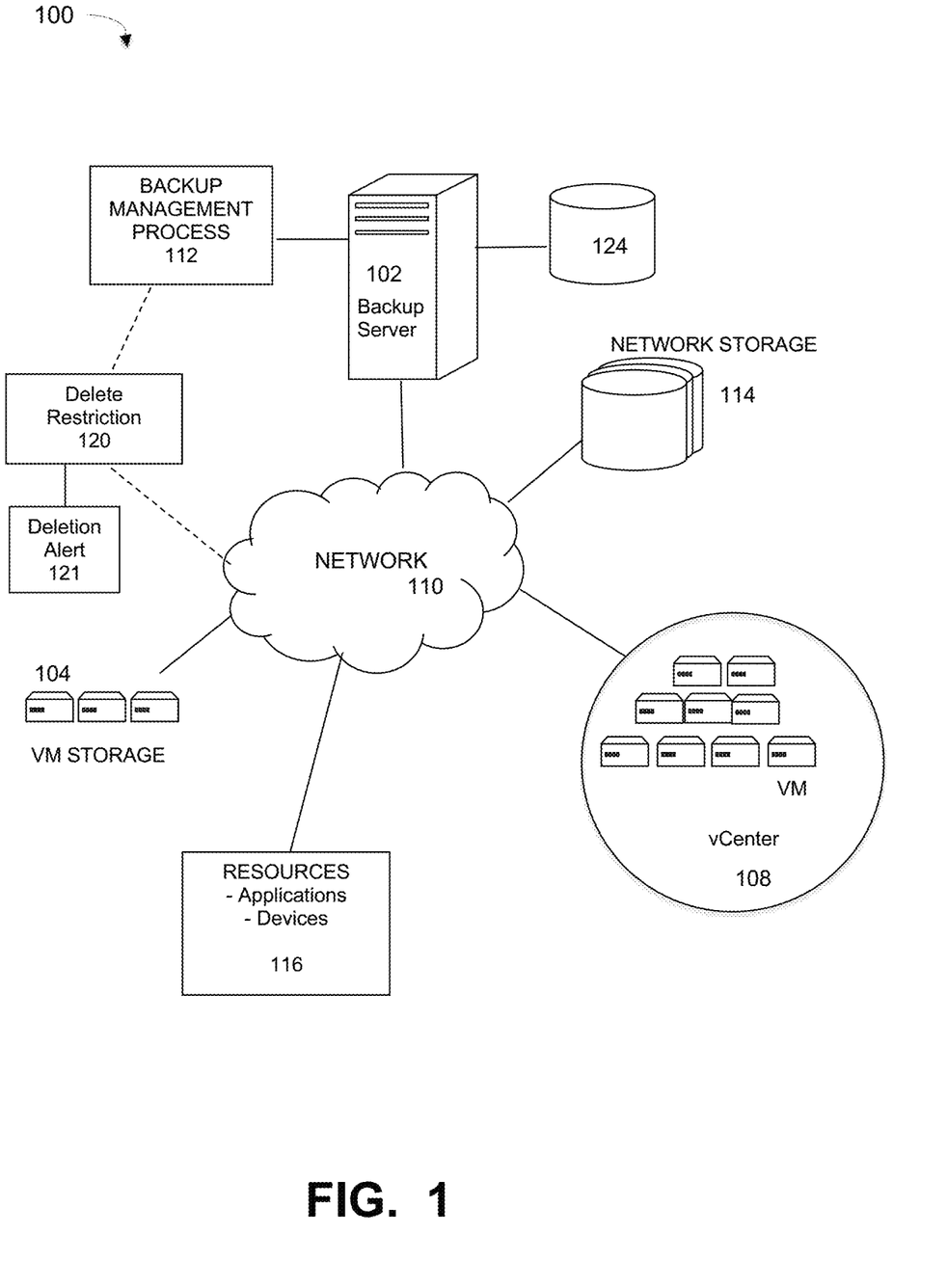
FIG. 1 is a diagram of a network implementing a delete restriction process to prevent data attacks, under some embodiments.

FIG. 1 illustrates a computer network system that implements one or more embodiments of a delete restriction process to prevent data attacks, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs may be provided to serve as backup targets. FIG. 1 illustrates a virtualized data center (vCenter) 108 that includes any number of VMs for target storage. The backup server implements certain backup policies 113 defined for the backup management process 112, which set relevant backup parameters such as backup schedule, storage targets, data restore procedures, and so on. In an embodiment, system 100 may comprise at least part of a Data Domain Restorer (DDR)-based deduplication storage system, and storage server 102 may be implemented as a DDR Deduplication Storage server provided by EMC Corporation. However, other similar backup and storage systems are also possible.

The network server computers are coupled directly or indirectly to the network storage 114, target VMs 104, data center 108, and the data sources 106 and other network resources, such as applications, and so on, through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing Backup software vendors typically provide service under a service level agreement (SLA) that establishes the terms and costs to use the network and transmit/store data specifies minimum resource allocations (e.g., storage space) and performance requirements (e.g., network bandwidth) provided by the provider. The backup software may be any suitable backup program such as EMC Data Domain, Avamar, and so on. In cloud networks, it may be provided by a cloud service provider server that may be maintained be a company such as Amazon, EMC, Apple, Cisco, Citrix, IBM, Google, Microsoft, Salesforce.com, and so on.

In most large-scale enterprises or entities that process large amounts of data, different types of data are routinely generated and must be backed up for data recovery purposes. This data comes from many different sources and is used for many different purposes. Some of the data may be routine, while others may be mission-critical, confidential, sensitive, and so on. As shown in the example of FIG. 1, the assets can include not only data sources, such as VMs 108, but other resources 116 that generate data or that require or benefit from different data backup and restore schedules. These can include the people of the organization, their devices, certain facilities, and so on. For example, if a certain class of personnel, such as executives create particularly sensitive or important data, policies that ensure secure and fast storage may be implemented for them, their devices, their teams, and so on, as opposed to having their data routinely archived with all the other normal data in the system. The resources 116 are often managed by access and control programs such as LDAP and/or they utilize certain critical programs within the company, such as e-mail, application software, and so on.

To ensure data security, strict access and role control is usually imposed on the personnel and resources of an organization. For example, certain roles/positions or specific persons may be designated as people who may or may not modify, destroy, or move certain data types or elements. Such controls are usually implemented through login protocols that allow system access only upon entry of valid username and password (or similar) credentials. If such information is hacked or improperly obtained, company data can be at great risk of damage or destruction.

Many attacks involve the outright deletion of data, or threatened deletion of data as in the case of ransomware attacks. As stated above, certain present measures such as requiring multiple confirmations to remove data or retention locking data can provide at least some level of data protection, but are either not robust enough for serious attacks, or impose involved and complicated processing requirements. To overcome these shortcomings, system 100 of FIG. 1 includes a delete restriction process 120 in which data is written once (never overwritten), and deletion is restricted so that it is only removed from the storage system based on a set of rules that are designed to prevent rogue data deletion requests from actually erasing the data from persistent storage. Such a process prevents deletion of data that was not intended to occur due to unexpected data deletion operations, or purposive attacks meant to maliciously destroy data. Through process 120, should an undesired data deletion occur for any reason, these delete operations will not result in data being removed or even staged for removal (e.g., put in trash). Thus, while some systems move data to a trash/recycle folder for eventual permanent removal, process 120 prevents data from even being staged for deletion. Only an authenticated process may remove data and this removal request must be confirmed multiple times. In short, this system uses a Write Only Restricted Delete (WORD) methodology.

For the embodiment of FIG. 1, the delete restriction process 120 may be implemented as a component that runs within a data protection infrastructure, and can be run as an independent application or embedded into an instance of data protection software 112 or as part of a data protection appliance. Any of those implementations may also be on-premise implementations on client machines within a user's data center or running as a hosted service within the cloud.

For purposes of description, the term "data" refers to a collection of bits/bytes and a key, such as a blob, and it's hash such as in a hash-based system; "write only" refers to a data item that is immutable so that any changes to it becomes a rewrite of the data (which also generates a new key or hash) along with the altered data, while allowing the original data and key to remain intact; "restricted delete" refers to the fact that data deletion or destruction is a restricted operation. While a data delete operation can be issued by the system or an authenticated user, a delete does not permanently erase the data from storage but becomes a "delete request." Data erasure only occurs during a system process that analyzes and verifies delete requests.

This system (WORD) is designed to operate on a key/blob system, such as a hash-based system. This program relies on the underlying system not removing data based on a single delete request, but instead only performing a data erase in a separate, post-process, such as garbage collection. It does so by looking at the time of when expirations were requested and verifying that these expiration timestamps match the times of a well-known process or processes. Data expiration, such as is performed regularly during backup in a data protection system, is an example of a well-known process as it typically occurs on a fixed schedule.

The WORD system maintains a list of valid programs that are shipped by the vendor that are known to delete data such as backup programs. Systems that support WORD will have a read-only store that holds a list of valid program signatures (e.g., hash, checksum, etc.) which are stored in an encrypted local database. This store will only be written when a system is initially configured or upgraded.

Table 1 below is an example of some entries for a valid program store. This table comprises a description of the programs (any number of programs) and their associated program signatures.

TABLE 1

| Signature | Program Description |
| --- | --- |
| 0x6EB837A2 | Filesystem Backup |
| 0x782DFC98 | NAS Backup |
| . | . |
| . | . |

Valid programs are further tagged to identify a specific instance of a valid program. In WORD, a tagged valid program that is known to request data expiration is called a Well-Known Process or WKP. Data backup and data migration are examples of valid programs as they are known to "expire" data, that is, to delete data due to a valid reason, such as age, replacement, invalidity, and so on. A policy ID is an example of a tag as it enables the program to differentiate between instances of a valid program, such as the backup of production databases (e.g., SQL) every x-hours (e.g., 4 hours) versus the daily backup of an NAS store. As used herein, a WKP thus means a tagged instance of a program shipped by the vendor that is known to expire data such as a specific policy applied to a backup program. In a backup system, a policy is typically an instance of backup program that runs on a set schedule (daily, weekly, etc.). Typically each instance is assigned a tag such as a policy ID. These are typically represented as a GUID.

Table 2 below is an example of a Well-Known Process list, under some embodiments.

TABLE 2

| WKP ID | Valid Program Signature | Tag (Policy ID) | Comments |
| --- | --- | --- | --- |
| WKP-0 | 0x6EB837A2 | 0da59bc2-98ea-11ec-b909-0242ac 120002 | NAS Backup of Engineering |
| WKP-1 | 0x6EB837A2 | 0da59bc2-98ea-11ec-b909-324ea8c 120419 | NAS Backup of Marketing |
| WKP-2 | 0x782DFC98 | 0da59bc2-98ea-11ec-b909-0242ac 120038 | SQL Database Backup |

Each WKP has its own set of expired data to be tracked. In an embodiment, this set of data is referred to as a Well-Known Process Expiration List (WEL). Each WKP will identify data that no longer needs to be retained (expired data) as is done during backup. This happens when data is no longer used by an asset and the data item has expired based on the controlling backup policy. Each WKP thus has a list known as the WKP Expiration List (WEL). The WEL has a set of timestamps and a list of data buckets. When a WKP runs and identifies expired data, the appropriate timestamp data will be written to its WEL. A timestamp corresponds to the exact time that the WKP runs. This applies to any type of data protection system as well as deduplicated backup systems. A WEL is thus a set of data buckets that track the hashes for expired data per WKP and a list of confirmation timestamps.

When the WKP runs it will also create a bucket and the hash of all newly expired data items during this invocation of the WKP will be added to this newly created bucket. This is the initial expiration time for a set of hashes. This process is repeated for every invocation of the WKP. By adding a timestamp and bucket to the WEL as is done during each invocation, the WKP will re-confirm that the hashes in each of the previously existing bucket are still considered to be expired. Buckets simply consist of a list of hashes to expired data. Each execution of the WKP inserts the starting timestamp into the WEL confirmation timestamp list.

The number of timestamps associated with each bucket effectively becomes the bucket's confirmation count. When a bucket has been confirmed a certain amount of times (e.g., 20 times), the hashes in the bucket are marked as fully confirmed. At that point, the hashes in the confirmed bucket become candidates for data deletion during garbage collection as the hashes are moved into the Data Delete Confirmed List (DDCL). The DDCL is thus a list of hashes that have been fully confirmed by a WKP.

In addition, the oldest timestamp is removed from the WEL. Once a WEL is created, the confirmation count cannot be altered so as to prevent rogue attacks. If the associated policy is deleted, the assets are removed as appropriate, however the WKP will continue to run. During each invocation, buckets will be confirmed, but no new buckets will be created. This process continues until all buckets have been confirmed, at which point the data in the last created bucket, the policy and the WEL will be removed.

Figure 2:
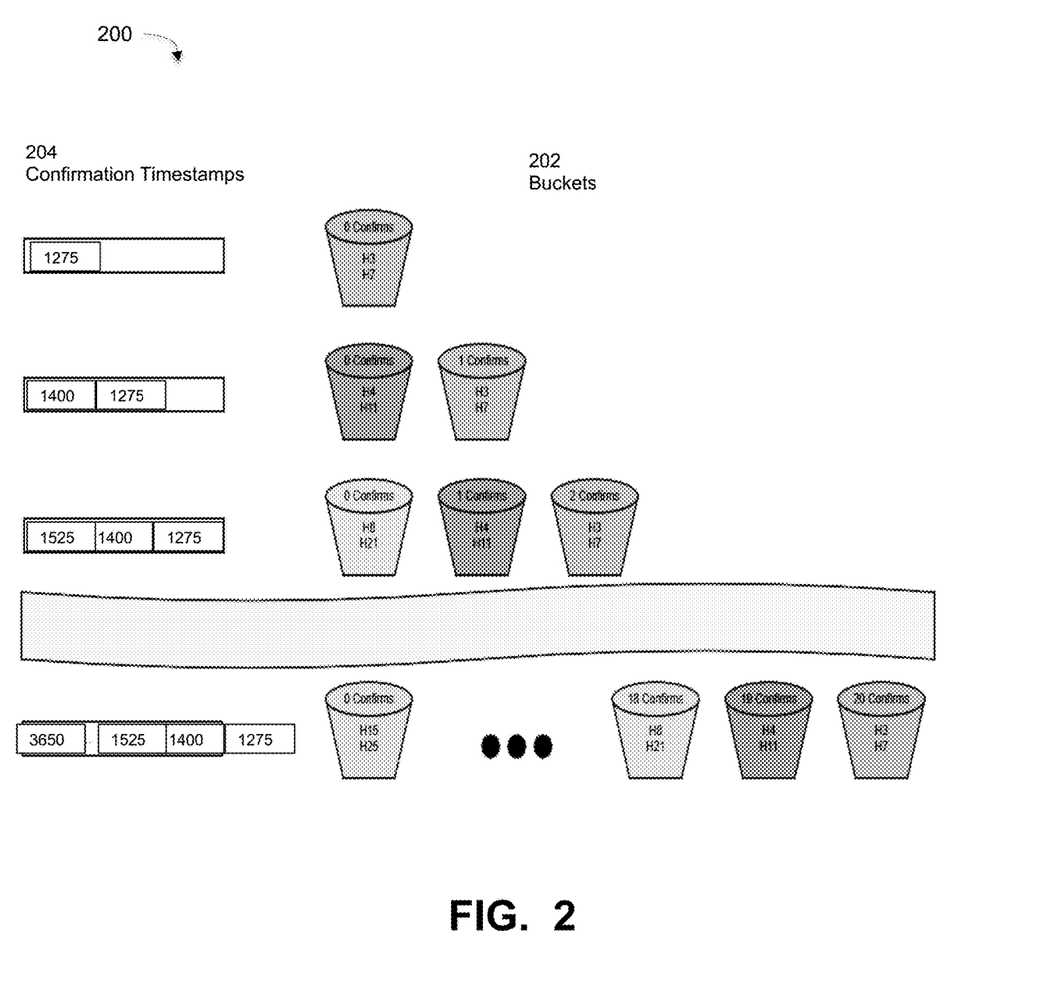
FIG. 2 illustrates an example of a Well-Known Process Expiration List (WEL), under some embodiments.

FIG. 2 illustrates an example of a Well-Known Process Expiration List (WEL), under some embodiments. Diagram 200 of FIG. 2 illustrates the state of the WEL at four different points in time based on the confirmation timestamps 204. These are the times that data corresponding to the hashes (Hx) are confirmed to be expired. During each execution of a WKP, the most recent WKP execution time is inserted in the front of the confirmation timestamp list. Every time the WKP process executes, its timestamp is written to the confirmation timestamp list 204. When the WKP executes, it is confirming that all existing data in each WEL bucket is "confirmed" to be validly deleted by the WKP. Once the size of this list 204 reaches the prescribed confirmation count (e.g., 20), the data in the oldest bucket is marked for deletion as it's delete status was confirmed this multiple number of times (e.g., 20 times).

As shown in the example of FIG. 2, the WKP creates a new bucket 202 on each invocation of the well-known process itself. The contents of this newly created bucket are the hashes to all the data that has expired during the current WKP invocation. For example, when the WKP initially executes at timestamp 1275, hashes H3 and H7 were identified as targets for data expiration as shown in the first row of buckets. The next execution (second row) at timestamp 1400 identified hashes H4 and H11 as expired. By adding the timestamp of 1400 and the bucket with H4 and H11, the oldest bucket that contains H3 and H7 will automatically have one confirmation with a timestamp of 1400. This processing continues during every WKP invocation. Once the size of the confirmation timestamp list 204 reaches the confirmation limit (20 in the above example), the oldest bucket is deemed to be fully confirmed. This list size (e.g., 20) is configured by the system administrator and represents the number of confirmations that are required before data may be considered for removal.

After a bucket has been confirmed the specified number of times, it is moved from the WEL into the Data Delete Confirmation List (DDCL). Before a bucket is moved to the DDCL, each hash is checked to ensure it does not already exist in the DDCL. Hashes may only occur once in the DDCL, as a single confirmation is sufficient. If a hash already exists in the DDCL, it is removed from the bucket before the bucket contents are moved.

Once a bucket has been confirmed, it is moved to the Data Delete Confirmation List (DDCL). All confirmed buckets from any WEL are moved into the DDCL. There is only one DDCL per system, and the purpose of this list is to use it as a cross reference check during data deletion as occurs in garbage collection. Only the data pointed by the hashes identified in GC that also exist in the DDCL may then be permanently erased.

Figure 3:
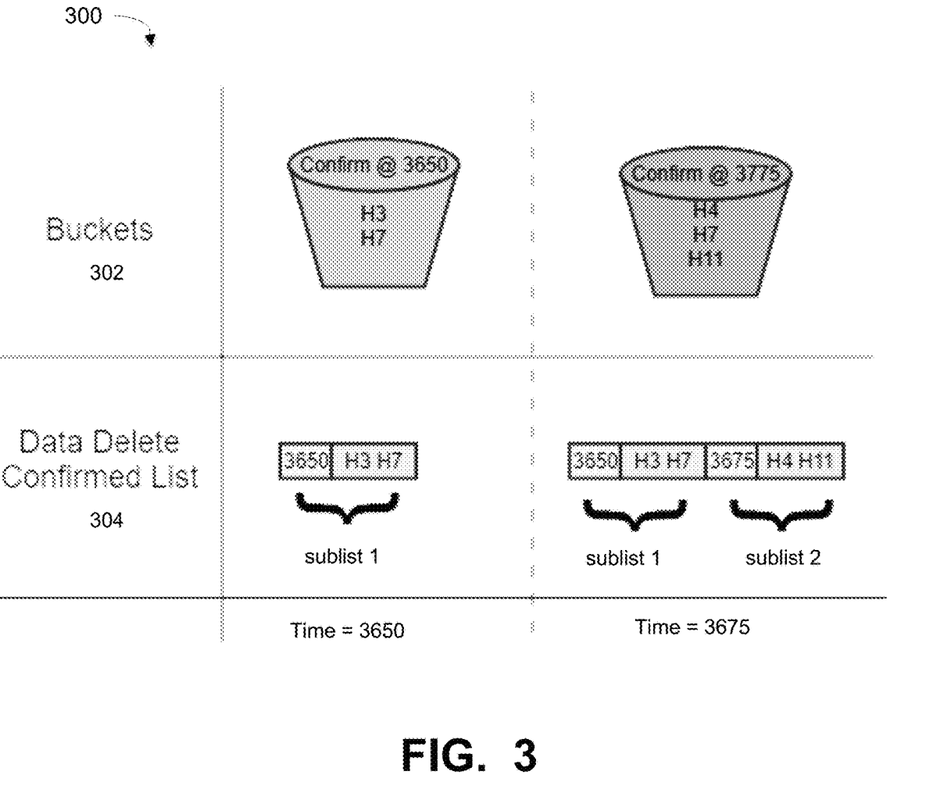
FIG. 3 illustrates a Data Delete Confirmed List (DDCL), under some embodiments.

FIG. 3 illustrates a Data Delete Confirmed List (DDCL), under some embodiments. Diagram 300 of FIG. 3 shows example buckets 302 and the state of associated Data Delete Confirmed Lists 304 at two separate points in time (Time=3650 and Time=3675). The DDCL only contains the unique hashes for data that was expired and confirmed by a WKP. A system's internal data deletion logic will examine the DDCL in conjunction with the set of hashes that are detected by garbage collection that are no longer being used. Note that the DDCL also holds the final confirmation timestamp for each set of hashes that came from a confirmed bucket. Each timestamp and associated hashes are known as a Sublist (e.g., sublist 1 and sublist 2, as shown).

In data protection systems, garbage collection (GC) processes are responsible for erasing data that is no longer needed. The WORD process enhances this process to ensure that data items to be deleted have been confirmed by a WKP prior to data erasure. As normal GC runs, it will create a list of hashes to be deleted (Garbage Collection List or GCL). The system will maintain a single GCL in addition to the single DDCL. The GCL is thus a list of hashes that GC determined may be erased.

Figure 4:
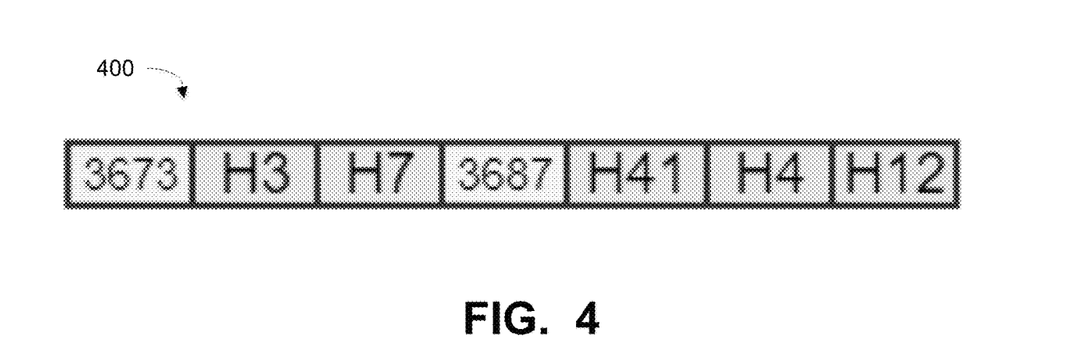
FIG. 4 illustrates the format and contents of an example garbage collection list (GCL), under some embodiments.

FIG. 4 illustrates the format and contents of an example garbage collection list (GCL), under some embodiments. Data deletion is s separate process that may be initiated by GC (typically upon completion) or it may be a scheduled background process. As shown in FIG. 4, the GCL comprises a set of time stamps (e.g., 3673, 3687) and the associated confirmed deleted hashes at each timestamp (e.g., "H3" and "H7" at 3673). Thus, as for the DDCL, the GCL also has a timestamp associated with a set of data hashes. This is the timestamp when the GC process began and includes the hashes which point to the data that is eligible for erasure. These timestamps can be used to examine and rectify issues for systems that encounter various unexpected conditions.

As described above, there are two separate system-wide lists that are created: the Data Delete Confirmed List (DDCL) and the Garbage Collection List (GCL). The data deletion process will find hashes that exist in both lists. In the first phase of delete, a list that merges the hashes in the DDCL and GCL is created. Hashes which exist in both lists represents the data that were deemed unnecessary by garbage collection and were confirmed by a data expiration process, i.e., a WKP.

Items that exist in the above merged list may safely be deleted. In addition, the hash entries in both lists (the GCL and DDCL) for the deleted data are marked as deleted. When all hashes in a sublist have been marked as deleted, the sublist can safely be removed. Hashes in the GCL and are not in the DDCL indicate an unexpected condition. Hashes in the DDCL and not the GCL indicate that a hash was common among multiple assets. At some point in the future, the GC process may determine that there are no references to this hash. This will cause the hash to be placed in the GCL and deleted during the next data deletion operation.

With respect to unexpected conditions, in addition to requiring data to be confirmed before deletion, WORD can provide clues to an administrator in terms of an attack or system error. Periodically, the GCL can be inspected to find data hashes that are much older than expected. For example, once a data hash is identified by a GC operation to be deleted, it is expected that the data would have been previously confirmed by at least one WKP. An alert should be raised if a piece of data is placed into the GCL and not exist in the DDCL as this indicates unexpected data attempting to be erased by GC. The timestamp of the offending data item in the GCL can help identify when this condition occurred.

Figure 5A:
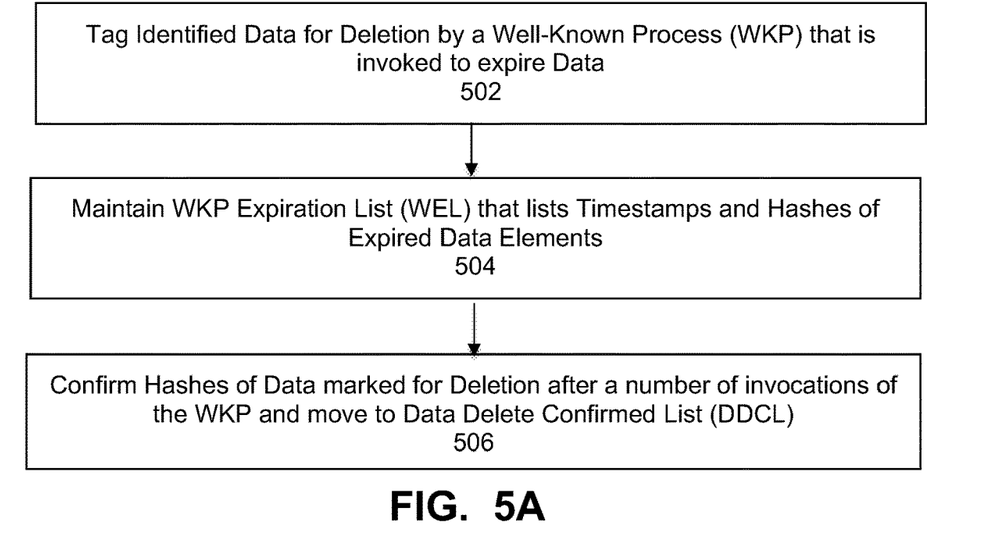
FIGS. 5A, 5B, and 5C are flowcharts that illustrates separate parts of a process of preventing attack on data in protection storage using delete restriction, under some embodiments.
Figure 5B:
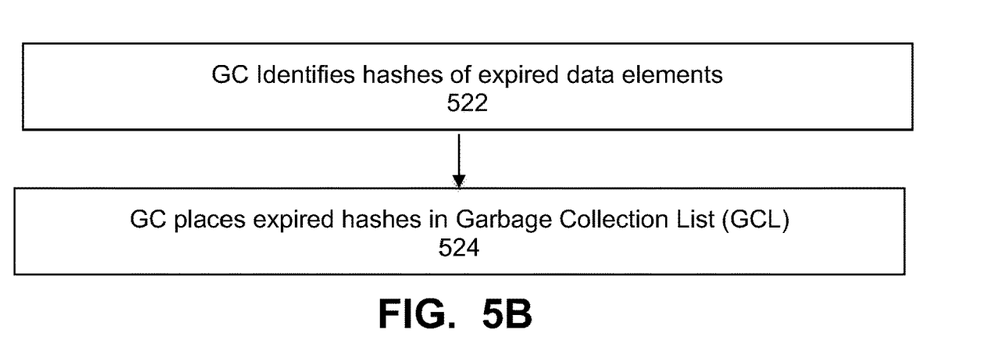
Figure 5C:
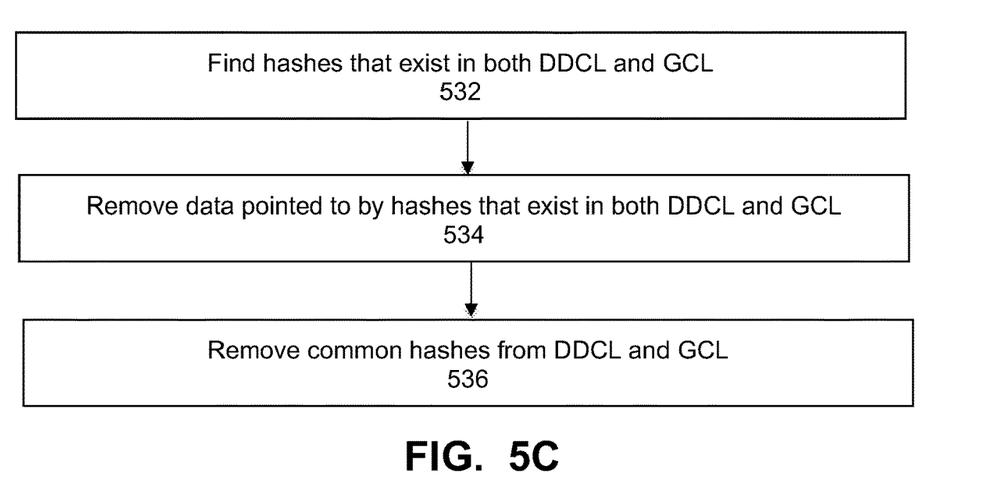

FIGS. 5A, 5B, and 5C are flowcharts that illustrates separate parts of a process of preventing attack on data in protection storage using delete restriction, under some embodiments. For the processes of FIGS. 5A-C, the computer system executes logic that permanently removes data only after separate processes, such as a WKP and a GC operation have both marked the data for removal. The process identifies such data marked for deletion by the application program. As shown in FIG. 5A, this data is then tagged for deletion by the WKP, 502, which is typically a program that routinely expires data, such as through data backups, migrations, restores, and the like.

The system maintains a WKP Expiration List (WEL) that lists timestamps of expiration (trashing or deletion) along with the hashes of expired data elements, 504. The process then moves confirmed hashes of data marked for deletion after a specified number (e.g., 20) of invocations of the WKP into the Data Delete Confirmed List (DDCL), 506.

Separately, as shown in FIG. 5B, the GC process identifies the hashes of the expired data elements, 522. The GC process then places these hashes of expired data elements (i.e., expired hashes) into the Garbage Collection List (GCL) with associated timestamps, 524.

Another separate process of data deletion, as shown in FIG. 5C process the hashes that exist in the DDCL and GCL. This process first finds the hashes that exist in both the DDCL and GCL, 532. The data pointed to by hashes that exist in both the DDCL and GCL can safely be permanently erased from the system, so in step 534, the process removes the data pointed to these common DDCL and GCL hashes, 534. Furthermore, the hashes that exist in both the DDCL and GCL are also removed (or marked for removal) from both the DDCL and GCL, 536.

The delete restriction component can execute the processes of FIG. 5A, 5B, and 5C as separate consecutive processes, or as an overall process integrating these processing flows.

Embodiments of the delete restriction process 120 thus prevent unwanted deletions of data in a more robust manner than present retention lock, dual party authorization, and similar mechanisms. Through process 120, data deletion must be confirmed by two separate workflows. First, a garbage collection operation that scans for data with zero references, and second, a well-known process confirms that data was expired, which prevents simpler techniques like dual party authorization based on timestamp from being bypassed.

Alerts for Excessive Deletions

The WORD process can be configured to delay the deletion of data for a certain period of time. The delay is provided to allow the deletion to be confirmed, which is done automatically. Embodiments of the delete restriction process 120 include an alert function 121 that monitors the amount of data being deleted at any one time, and analyzes it on a historical basis. If the amount of a data request exceeds the historical amount by certain defined metrics, an alert will be generated and sent to the user or system administrator. The alert receiver can then stop or change an anomalous data deletion request, or ignore the alert if appropriate.

Under WORD, data hashes are marked for deletion by certain well-known processes, such as data backup or garbage collection (GC). The WORD process will look at data marked for deletion and after it has been confirmed for a certain number of days or cycles. Only once the marked data has been fully confirmed will the data finally be deleted. Until data is deleted, it is recoverable.

Figure 6:
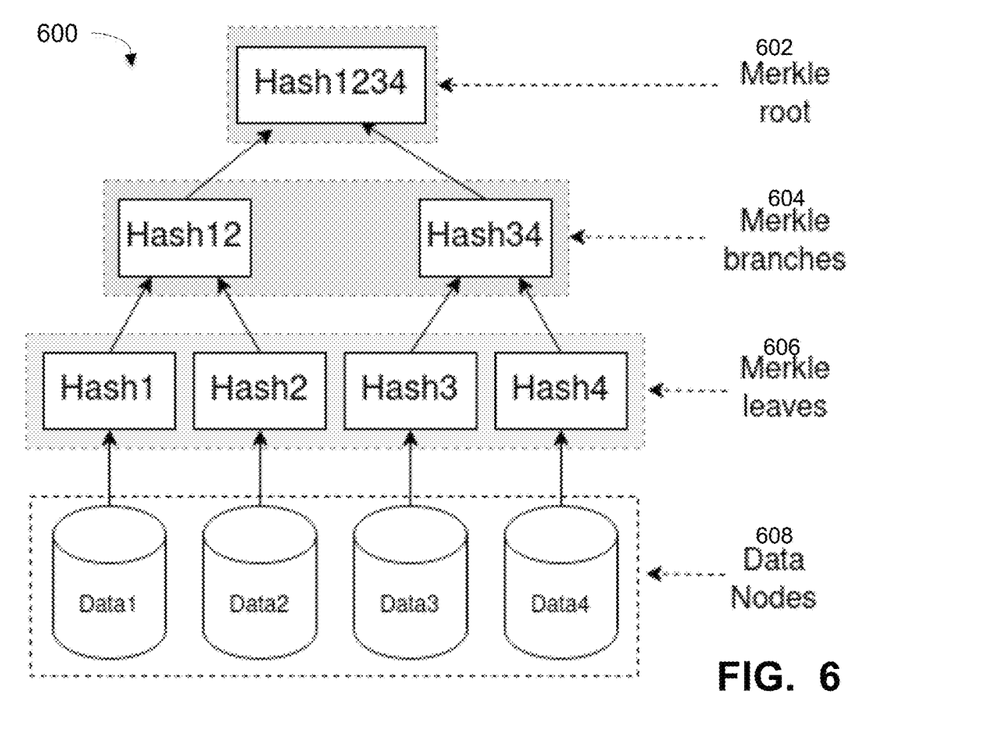
FIG. 6 illustrates a Merkle tree representation of data in a deduplicated backup system, under some embodiments.

In general, deduplicated backup data is referenced by a hash value. In some implementations, a Merkle tree is used to represent the underlying data. FIG. 6 illustrates a Merkle tree representation of data in a deduplicated backup system, under some embodiments. As shown in FIG. 6, Merkle tree 600 comprises a Merkle root 602 above a set of Merkle branches 604 that store Merkle leaves 606 that themselves are hash values for respective data nodes 608. The data hashes, shown as Merkle leaves 606, are each a hash that points to the actual data in the nodes (e.g., Data1, Data2, Data3, Data4). The hashes in the Merkle branches 604 and Merkle root 602 are metadata that is used for efficient representation and storage of the underlying objects (e.g. files). Each leaf represents an approximate amount of data (e.g., around 30k bytes). For the excessive deletion alert function 121, each hash indicates if it is a data hash or an intermediate (non-data) hash.

Figure 7:
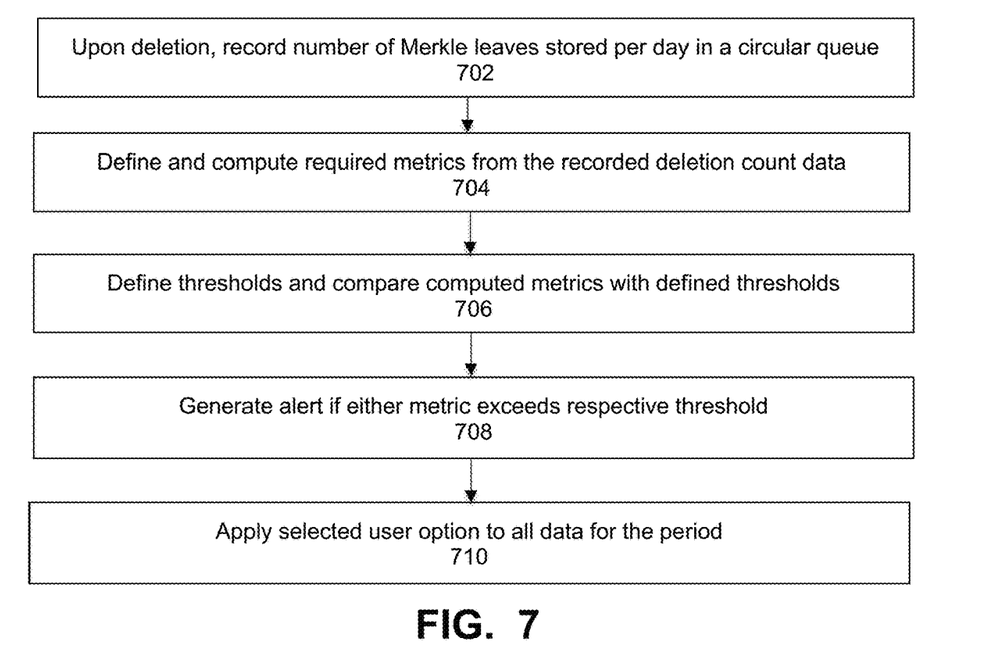
FIG. 7 is a flowchart that illustrates a method of providing an excessive deletion alert for a WORD process, under some embodiments.

FIG. 7 is a flowchart that illustrates a method of providing an excessive deletion alert for a WORD process, under some embodiments. As shown in process 700, when WORD performs a data deletion, a record of the number of Merkle leaves will be stored per day in a circular queue, 702. The length of this queue will equal the number of data confirmations that are required before data is to be deleted. This number represents a deletion count, and corresponds to the data confirmation number. The system will then compute one or more metrics from this recorded count data, 704. In an embodiment, two metrics are computed and comprise the average data size and the maximum daily variance for the set of data.

Figure 8A:
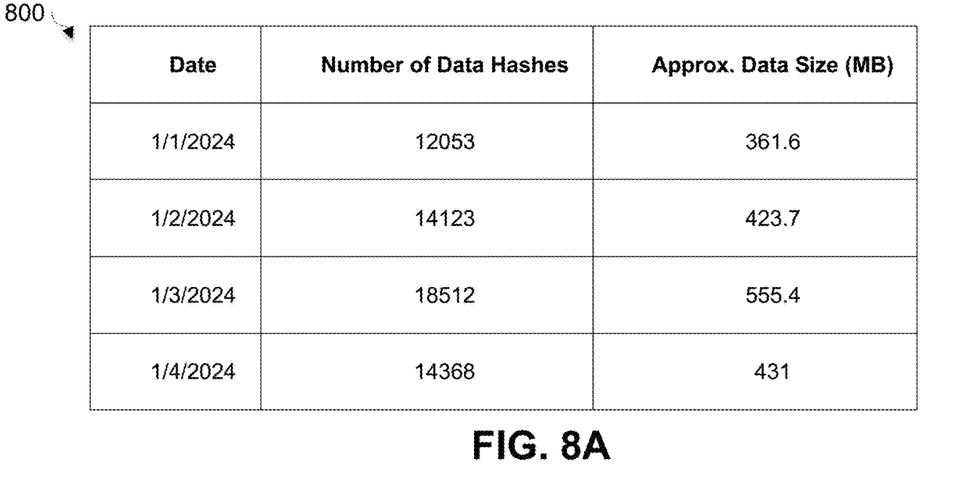
FIG. 8A is a table that illustrates some example hash values for data deletions, under an example embodiment.

FIG. 8A is a table that illustrates some example hash values for data deletions, under an example embodiment. Table 800 of FIG. 8A shows the deletions for each day from Jan. 1, 2024 to Jan. 4, 2024 with their respective hash count numbers and the approximate total data size of the deleted data for each respective day. The number of data hashes column represents the count value for the Merkle leaves 606 counted for each confirmed deletion.

It should be noted that Table 800 is provided for purposes of illustration and any number of deletions and data amounts are possible. Four deletions and associated example values are shown for brevity, but the number is typically higher, such as on the order of 20 or more deletions per day.

For the sample of four deletion confirmations in FIG. 8A, it can be calculated that the average data size of deleted data is 442.9 MB ((3611.6+423.7+555.4+431)/4). This value is then used to calculate the average percentage of bytes changed for each day.

Figure 8B:
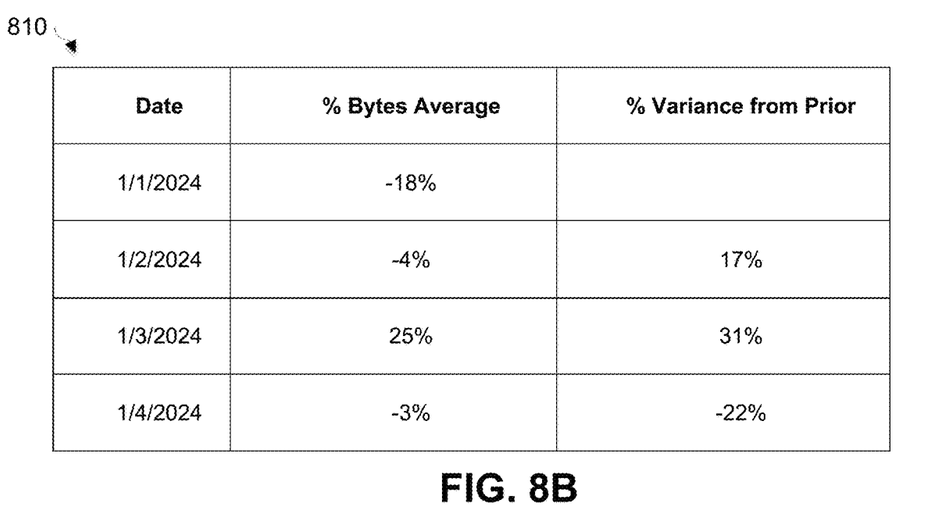
FIG. 8B illustrates the calculation of the average data size and maximum daily variance for the example of FIG. 8A.

FIG. 8B illustrates the calculation of the average percentage of bytes for the example of FIG. 8A. In this example, the average percentage of bytes changed relative to the average data size is calculated for the "% Bytes Average" column. For example for 1/1/2024, this value is calculated as: (442.9−361.6)/442.9 to yield 18% as shown in FIG. 8B. The % bytes average value for each of the other days is similarly calculated using the average data size.

FIG. 8B also illustrates the calculation of the maximum daily variance for the example of FIG. 8A. The % daily variance for each day is calculated as the percentage difference between the number of data hashes for successive days. Thus, the % variation between 1/2/2024 and 1/1/2024 can be calculated as: (14123−12053)/12053=17%. This value is calculated for each day, the example of FIG. 8B gives a maximum daily variance of 31% ((18512−14123)/14123) for 1/3/2023.

Figure 8C:
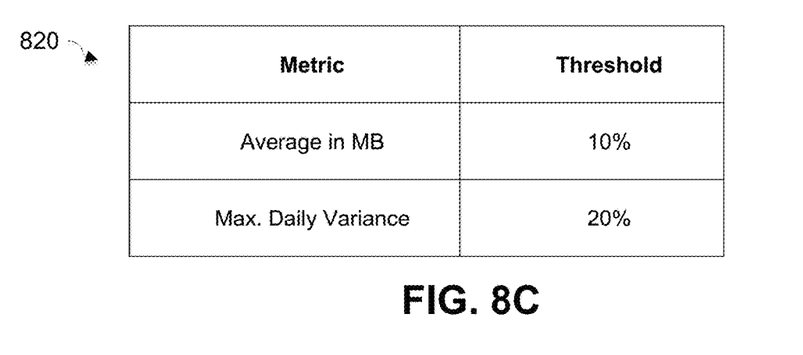
FIG. 8C illustrates example threshold values for the calculated metrics of FIG. 8B.
Figure 9:
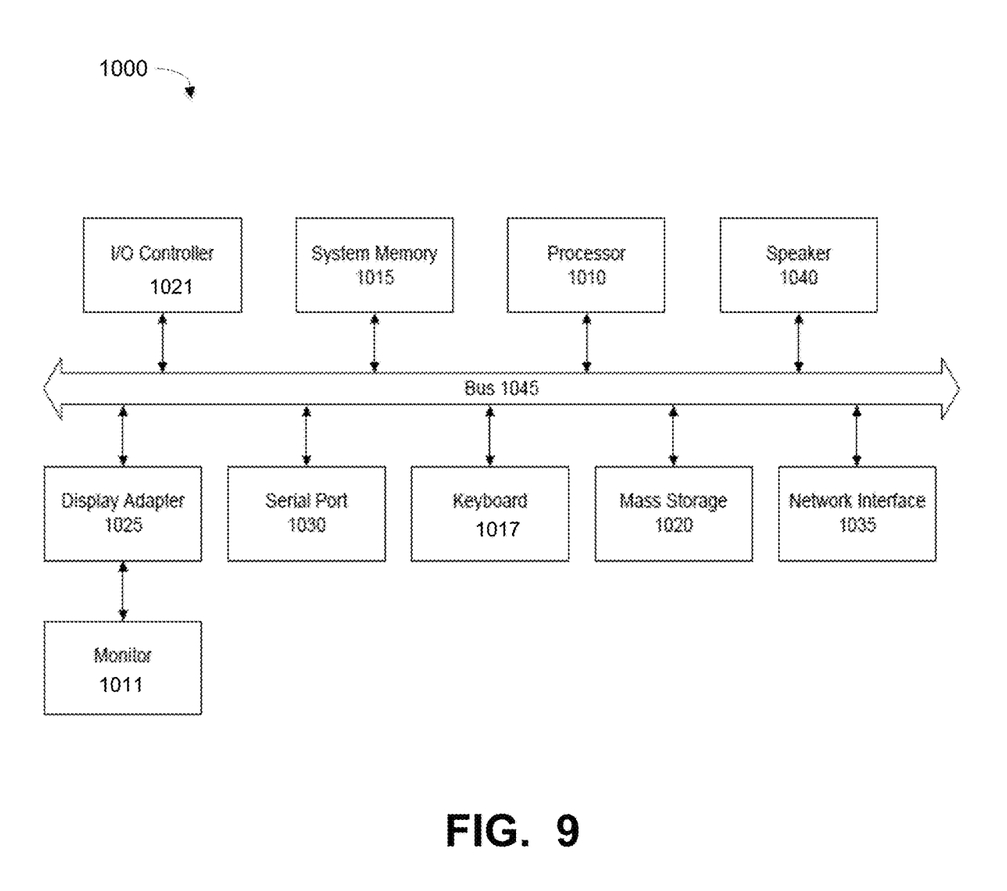
FIG. 9 is a system block diagram of a computer system used to execute one or more software components of a delete restriction process to prevent data attacks, under some embodiments.

As shown in FIG. 7, process 700 also defines respective threshold values for each of the computed metrics, 706. FIG. 8C illustrates example threshold values for the calculated metrics of FIG. 8B. For this example, the % bytes average threshold is set at 10% and the % maximum daily variance threshold is set at 20%. These are just example threshold values and any other threshold values can be used. Likewise, FIG. 8B illustrates two possible metrics (average bytes and daily variance), and embodiments are not so limited. Other or additional metrics may also be used, as appropriate depending on system configuration and constraints.

When the WORD process executes, it will determine whether either of the thresholds have been exceeded for the prior day, 706. For the example of FIGS. 8B and 8C, both metric thresholds have been exceeded as 25% versus 10% for the % bytes average metric, and 31% versus 20% for the % variance metric.

If either threshold is exceeded (as in the case of the given example), this will be interpreted as unusual deletion activity, and the system will generate an alert to the user or system administrator, 708. The alert may be embodied and sent as any appropriate alert or message warning, such as by text message, email or voice message, console message (graphic or audible), and so on.

This alert then provides the user or administrator with the opportunity to undertake one of several options, such as preserve the data, delete the data, and investigate the deletions. One of these options will need to be selected, and will then be applied to all the data that is to be deleted for that period (e.g., day), 710.

In response to the alert, the user may tell the system to preserve the data. This will remove the hash entries from the data deletion list. The data will now remain available until another process marks the data for deletion, and it passes the confirmation count using the standard WORD workflow.

The user may instead elect to delete the data. This will clear or acknowledge the alert to allow the data deletion to be confirmed and proceed as normal.

The user may choose to investigate the alert condition, which indicates that they have decided that some research into the data must be performed.

In an embodiment, deferred deletions will generate a daily reminder. Data confirmations will continue to be registered against deferred data, but no deletion will occur. This is similar to a data hold, and will move the hashes from the data deletion list into a data hold list. In this case, the defer date and confirmation information will be preserved. If the user decides to release the "hold" on a data set, the data will be returned to the data deletion list and the confirmations will be updated and added to those that would have happened if the data was never placed on the hold list.

Besides the above listed options, user/administrator may have other options, such as to alter the thresholds going forward, interrogate the data such as viewing the underlying data segments and/or the metadata before making a decision to preserve or allow the data to be deleted. The metadata may include the backup(s) that are associated with the data, the asset(s) that are associated with the data, and any other relevant metadata that may be available.

In an embodiment, the calculated metrics are monitored and compared to historical data where the history comprises a previous day for a given set of delete operations (e.g., 4 days as shown in FIG. 8A). Other periods are also possible, such as hourly, weekly, monthly, etc., depending on system configuration and constraints.

Embodiments thus provide a way to track the amount of data being deleted at any one time on a historical basis so that when the amount of a data request exceeds defined thresholds of the metrics, an alert will be sent to the user, who can then take appropriate action to stop, allow, or analyze the deletions.

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of preventing unwanted deletion of data with alerts of excessive deletes in a system, comprising:
    deleting data that no longer needs to be retained by an application program of the system;
    recording, for each deletion, a count as recorded count data;
    computing one or more metrics within a time period from the recorded count data;
    comparing the one or more computed metrics to a defined corresponding threshold value; and
    generating, if any of the one or more computed metrics exceeds the corresponding threshold value, an alert to be received by a user to indicate that an excessive number of deletions has been requested.

2. The method of claim 1 further comprising:
    providing the user with a plurality of options to select to address the excessive number of deletions; and
    applying a selected option to all deleted data within the time period.

3. The method of claim 2 wherein the plurality of options comprises at least one of: cancel each deletion to preserve the data, acknowledging the alert to allow deletion of the data, and investigating conditions of the alert for later disposition of each deletion, and further wherein the investigating further comprises viewing underlying data segments and metadata of the data to select an option of the plurality of options, wherein the metadata comprises at least one of backup jobs associated with the data or data assets associated with the data.

4. The method of claim 3 further comprising:
    generating hashes for deleted units of data;
    marking the hashes for deletion in the deleting;
    delaying the deleting until confirmation of deletion is received from the user, wherein the confirmation comprises acknowledging the alert to allow deletion of the data to generate confirmed deletions.

5. The method of claim 4 wherein the deleting comprises a Write Only Restricted Delete (WORD) operation that allows ultimate removal of data after the confirmation.

6. The method of claim 4 wherein the hashes are stored in Merkle leaves of a Merkle tree used in a filesystem by the application program, and wherein the hashes in the Merkle leaves each point to a respective data node storing the deleted units of data.

7. The method of claim 6 further comprising storing a number of Merkle leaves corresponding to the confirmed deletions in a circular queue, wherein a length of the circular queue corresponds to a number of deletion confirmations required before the data is deleted.

8. The method of claim 7 further comprising:
    compiling a number of hashes and a data size of deleted data for respective time periods;
    computing the one or more computed metrics from the compiled number of hashes and data size; and
    computing an average data size over a defined number of time periods using the data size for each time period.

9. The method of claim 8 wherein the one or more computed metrics comprise a percentage change in data size within a time period relative to the average data size, and a percentage variance in deleted data between two successive time periods.

10. The method of claim 9 further comprising defining a respective threshold value for each of the one or more computed metrics for the comparing.

11. The method of claim 1 wherein the deleting step deleting at least one data element that is no longer used by a data asset of the system, and that has expired based on a controlling policy, wherein data expiration comprises at least one of: data subject to a deletion operation, data older than a defined age threshold, data marked as corrupted, and data overwritten by newer data.

12. A computer-implemented method of limiting a number of deletes in a system executing an application, comprising:
defining threshold values for metrics related to data deletes based on size of deleted data and variation of deletions within a set of time periods;
receiving deletion instructions for the data deletes;
compiling deletion counts for the data deletes within each time period of the set of time periods;
comparing one or more computed metrics related to the deletion counts to one or more corresponding defined threshold values;
allowing a user to confirm the data deletes using the comparing;
delaying the data deletes specified by the deletion instructions until user confirmation is received; and
generating an alert to the user if any of the threshold values is exceeding in the comparing.

13. The method of claim 12 wherein the data deletes comprise Write Only Restricted Delete (WORD) operations that allow ultimate removal of data after the confirmation.

14. The method of claim 12 further comprising computing an average data size over a defined number of time periods of the set of time periods using a size of data deletes for each time period.

15. The method of claim 14 wherein the one or more computed metrics comprise a percentage change in data size within a time period relative to the average data size, and a percentage variance in deleted data between two successive time periods.

16. The method of claim 12 further comprising:
providing a user with a plurality of options to select to address an excessive number of deletions; and
applying a selected option to all deleted data within a time period.

17. The method of claim 16 wherein the plurality of options comprises at least one of: cancel each deletion to preserve data, acknowledging the alert to allow deletion of the data, and investigating conditions of the alert for later disposition of each deletion, and further wherein the investigating further comprises viewing underlying data segments and metadata of the data to select an option of the plurality of options, wherein the metadata comprises at least one of backup jobs associated with the data or data assets associated with the data.

18. The method of claim 13 further comprising:
generating hashes for each deleted unit of data of the data deletions;
marking the hashes for deletion in the receiving; and
storing the hashes in Merkle leaves of a Merkle tree used in a filesystem by the application, and wherein the hashes in the Merkle leaves each point to a respective data node storing deleted units of data.

19. The method of claim 17 further comprising storing a number of Merkle leaves corresponding to the confirmed deletions in a circular queue, wherein a length of the circular queue corresponds to a number of deletion confirmations required before the data is deleted.

20. A method of preventing unwanted deletion of data with alerts of excessive deletes in a system, comprising:
implementing a Write Only Restricted Delete (WORD) operation that allows ultimate removal of data after confirmation of a deletion request;
computing one or more computed metrics of data deletions for each time period within a set of time periods;
comparing the one or more computed metrics with corresponding defined thresholds for the data deletions for each time period;
generating an alert to a user if any of the corresponding defined thresholds is exceeded;
receiving a user selection in response to the alert; and
confirming the deletion request if the user acknowledges the deletion request, otherwise stopping the deletion request if the deletion request is denied or marked for investigation by the user.

* * * * *